Jan. 21, 1941.                T. STIEBEL                2,229,261
ELECTRICALLY HEATED HOT WATER RESERVOIR
Filed Aug. 22, 1938          2 Sheets-Sheet 1
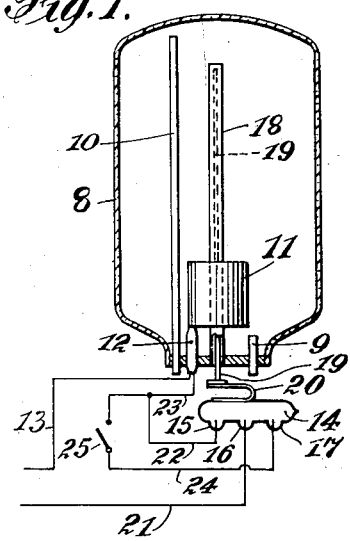
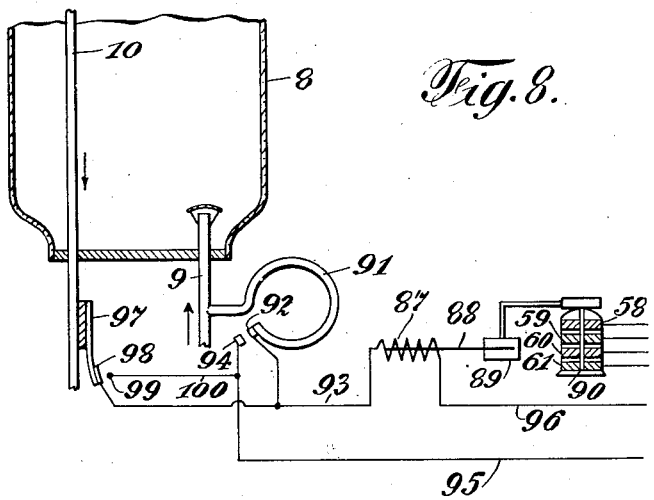
INVENTOR.
Theodor Stiebel
John A. Seifert
his ATTORNEY.

Jan. 21, 1941.                T. STIEBEL                2,229,261
              ELECTRICALLY HEATED HOT WATER RESERVOIR
                    Filed Aug. 22, 1938          2 Sheets-Sheet 2
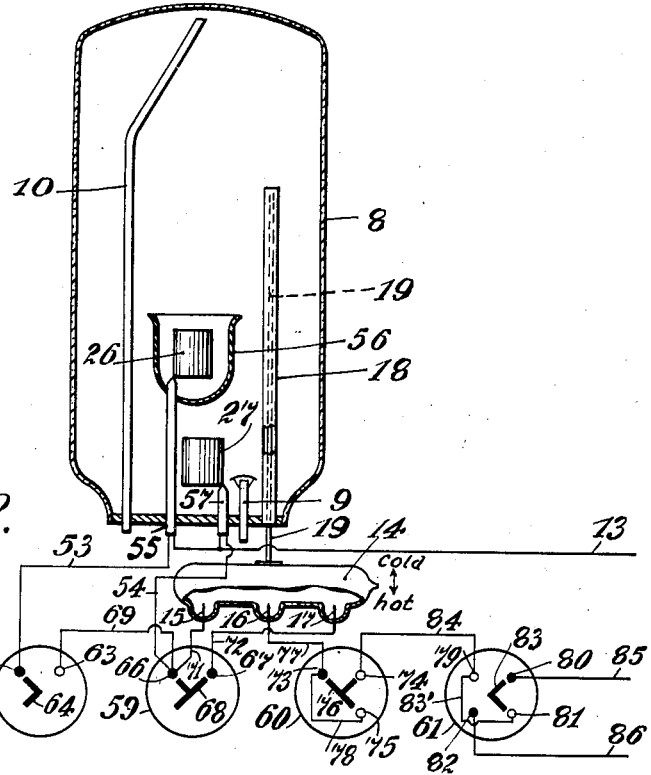
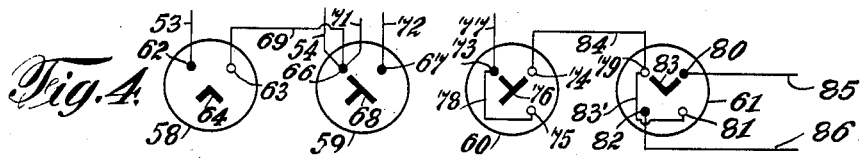
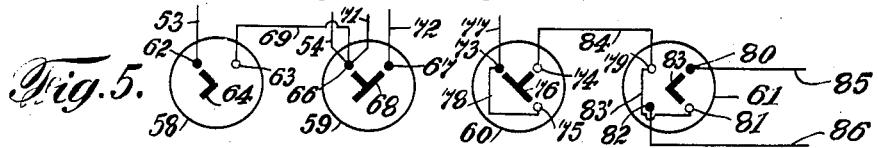
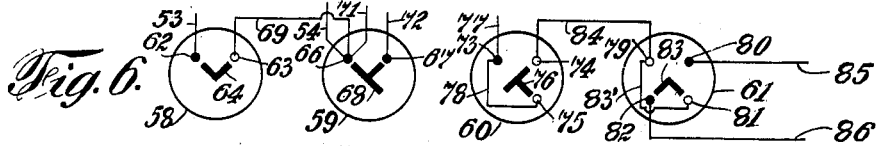
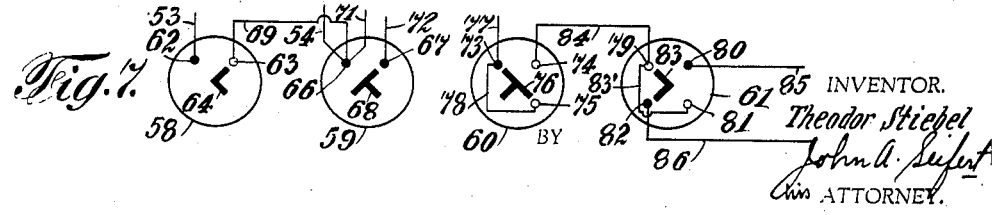
INVENTOR.
Theodor Stiebel
BY John A. Seifert
his ATTORNEY.

Patented Jan. 21, 1941

2,229,261

UNITED STATES PATENT OFFICE 2,229,261

ELECTRICALLY HEATED HOT WATER RESERVOIR

Theodor Stiebel, Berlin-Tempelhof, Germany

Application August 22, 1938, Serial No. 226,100

12 Claims. (Cl. 219—39)

This invention relates to electrically heated hot water reservoirs especially adapted for home use.

The primary object of the invention is to provide an ingenious and simple arrangement of settable means with an electric switch device actuated by a temperature responsive device rendered active by the temperature of the water in the reservoir to be heated to control and regulate the electric heat output and the heating of the water to two or more stages or degrees of temperature as well as regulating the rapidity of the heating of the water.

Furthermore, the invention is particularly adapted for use where electric current is available at different schedules of costs or tariffs to effect heating of the contents of the reservoir mainly by the electric current supplied at the lower schedule of cost.

In the electric hot water heaters now in commercial use, it is possible to regulate the temperature of the water in a reservoir by adjusting switching mechanism of said heater but the switching mechanism of such heaters are enclosed in a casing which necessitates the removal of a cover plate of said casing and the use of tools to effect the adjustment of the switching mechanism. This adjusting of the switching mechanism of the present type of water heater will take time and permits inexperienced persons to tamper with the switching mechanism which is dangerous and undesirable. To prevent tampering of the switching mechanism by inexperienced persons, the cover plates thereof are usually sealed.

To overcome the above disadvantages of the present type of hot water heater, the present invention provides a simple switch to preselect the temperature of the water in the reservoir at which temperature electric heating means mounted in the reservoir is disconnected or cut out of circuit with a source of electricity.

In the heaters of heretofore known types, the electric heating elements thereof have been adjusted to heat the water to a predetermined temperature regardless of variation in the requirements of hot water for household uses, whereby a greater part of the energy used in heating the water is lost by the cooling of the water while stored in the reservoir and when the quantity of water used is small. This disadvantage is overcome by the present invention by the use of switch mechanism interposed in the circuit of the heating element and a thermostatically operative switch for controlling the heating element.

It is further the present practice of heating water in a reservoir by electric current sold at a low rate or tariff, which occurs usually during the night when demand for electric current is slight, to provide heating means which will heat the water to 85° C. within the period at which the electric current is available at a low cost. If the user of the hot water desires to have water at a temperature of only 45° C., he will set the thermostatically operative switch to cut the heating means out of circuit with the source of electricity when the water has reached a temperature of 45° C. The heating of the water to a temperature of 45° C. by heating means adapted to heat the water to 85° C. within the period of low cost electric current will only require half of said period of low cost. This, however, is not to the advantage of the user, because during the last half of the period of low cost distribution of electric current, the water in the reservoir cools and at the end of said period the water is usually cold and it will be necessary to use electric current at the usual rate of cost, if hot water is desirable. This procedure on the part of the user is also not advantageous to the distributor of electric current because the current is only used for half the period of low cost distribution and it is in the interest of the distributor that the consumption of electricity during said period be uniform for the entire period of low cost distribution.

This defect in the present practice of heating water at low cost is overcome by the present invention by utilizing heating means having portions of different heating values and connected in circuit with settable switch means adapted to be adjusted to permit the connecting of the different portions in circuit with the source of electricity in proper sequence, whereby there will be a uniform consumption of electricity during the period of low cost distribution.

Other objects and advantages of this invention will be set forth in the detailed description of the different embodiments of the invention.

In the drawings accompanying and forming a part of this application:

Figure 1 is a diagrammatic view of an embodiment of the invention showing a water reservoir in cross section, an electric heating element mounted therein and settable means for preselecting the maximum temperature of the heated water.

Figure 2 is a diagrammatic view of a modified form of electric circuit having heating means of different heat values which may be substituted for the circuit shown in Figure 1.

Figure 3 is a diagrammatic view of another embodiment of the invention wherein a pair of electric heating elements having different heating values are shown with settable switch mechanism for preselectively connecting the heating elements to two different meters connected to a source of electricity for registering the amount of electricity consumed at different rates of cost.

Figures 4 to 7, inclusive, are diagrammatic views of the settable switch mechanism shown in Figure 3 and showing respectively the positions of said mechanism to energize the heating element of low heat value through the meter for low cost electricity, to energize the heating element of low heat value through the meter for low cost electricity for a greater length of time, to energize both heating elements through the meter for high or regular cost electricity, and to disconnect both heating elements from both meters; and Figure 8 is a fragmentary view of the lower portion of the water reservoir and showing means operative by the discharge of hot water from the reservoir to actuate the settable switch shown in Figures 3 to 7, inclusive, and connect the electric heating elements to the meter registering the low cost electricity.

In carrying out the embodiment of the invention illustrated in Figure 1, there is provided a water reservoir or tank 8 having a cold water inlet pipe 9 entering and terminating in the reservoir at the bottom thereof, and a hot water discharge pipe 10 mounted in the reservoir in communication with the water in the upper part thereof. The water in the reservoir is heated to predetermined temperatures by an electric heating element 11 of the immersion type, as shown in my Patent No. 2,060,644, issued November 10, 1936, mounted in the reservoir by a suitable electric insulated support fixed in the bottom of the reservoir, as at 12, and adapted to carry electric conductors connected to the terminals of the heating element and extended exteriorly of the reservoir, one of said conductors being connected to one side of a source of electricity, as at 13.

The other side of the source of electricity is connected to the heating element 11 through thermostatically and manually operative switch mechanisms, whereby the heating of the water to a predetermined temperature is controlled by the temperature thereof and the heating of the water above said predetermined temperature is controlled by the user. The thermostatically operative switch mechanism is shown to be in the form of a mercury switch comprising a sealed tube 14 containing mercury and arranged with three spaced depressions or pockets for the mounting of fixed contacts therein, as at 15, 16, and 17. The tube 14 is pivotally mounted transversely of its longitudinal axis in the usual manner relative to the bottom of the reservoir, so that the tube will be turned in a clockwise direction, looking at Figure 1, by a rise in the temperature of the water in the reservoir 8 through the action of a thermostat device comprising a fixed carrying casing 18 mounted in the bottom of the reservoir and extended into the reservoir centrally of the heating element 11 and to adjacent the upper end thereof, and a temperature expansion rod 19 engaged in the casing 18 and having one end portion extended through the bottom of the casing 18 and reservoir 8 and operatively connected to the mercury tube 14 by a coupling member 20, whereby the expansion of the thermostat-rod 19 will tilt the right hand end of the tube, looking at Figure 1, in a downward direction.

When the water is cold in the reservoir 8, the mercury switch tube 14 is positioned by the thermostat rod 19 with the mercury connecting the contacts 15 and 16, which will complete the circuit of the heating element 11 through a conductor 21 leading from the side of the source of electricity opposite to the side connected to the heating element to contact 16, and a conductor 22 leading from contact 15 to a conductor 23 of the conductors connected to the heating element 11. The contact 17 is also connected to the conductor 23 by a conductor 24 and manually operative switch, as diagrammatically indicated at 25 in Figure 1. The energization of the heating element by the completion of the circuit through the contacts 15 and 16 will heat the water to a temperature at which the expansion rod 19 expands and actuates the mercury tube 14 to position the mercury out of engagement with the contact 15 and into engagement with contacts 16 and 17, whereby the circuit of the heating element 11 with the source of electricity will be through conductor 21, contact 16, the mercury bridging contacts 16 and 17, contact 17, conductor 24, switch 25 and conductor 23. This circuit is only completed when it is desirable to heat the water in the reservoir to a high temperature or to a temperature higher than the temperature required for moving the mercury in tube 14 from contacts 15, 16 to contacts 16, 17. If it is desirable to heat the water to said higher temperature, the switch 25 is actuated to close position to connect conductor 24 with conductor 23, and if said temperature is not desirable, the switch is actuated to open position, whereby the side of the source of electricity connected to the mercury switch is disconnected from the heating element. Should the switch 25 be actuated to closed position, the water in the reservoir 8 will be heated to a predetermined temperature which will cause the thermostat rod 19 to actuate the mercury tube 14 and position the mercury out of engagement with contact 16 and only in engagement with contact 17, whereby the circuit of the heating element 11 will be broken between contacts 16 and 17 of the mercury switch.

It should be understood that the temperatures of the water in the reservoir 8 at which the mercury switch tube 14 is actuated, may be varied to predetermined degrees by the form of mercury tube 14 and the amount of expansion of the thermostat rod 19. In Figure 1, a straight mercury switch tube is illustrated but this tube may be of curved formation as shown in Figure 2. The amount of expansion of the rod 19 depends on the material used and the relative length between the rod 19 and casing 18.

In the circuit disclosed in Figure 1, it is only possible to heat the water in reservoir 8 to two predetermined temperatures. If it is desirable to heat the water to three predetermined temperatures, the circuit disclosed in Figure 2 is used, which includes a heating element divided into portions having different electric heat output or value or a pair of heating elements of different electric heat output, as indicated at 26 and 27 in Figure 2, adapted to be mounted in the reservoir 8 shown in Figure 1, relative to the thermostat 18, 19. In the present instance the heating portion or element 26 has a heat output of 700 watts and heating portion or element 27 has a heat output of 500 watts. The thermostat actuates a mercury switch comprising a mercury tube 28 of curved formation and arranged with five spaced depressions or pockets 29, 30, 31, 32 and 33 in the convex side thereof. One side of each heating portion or element 26, 27 is connected to one side of a source of electricity by the conductor 13 and the opposite side of the source of electricity is connected by the conductor 21 to a contact 34 mounted in the depression 30 and having an arcuate conductor 35 bridging the depression 31 and terminating in the depression 32. The depressions 29, 31 and 33 are arranged with fixed contacts 47, 51 and 49, respectively, connected in circuit with sides of the heating portions or elements 26, 27 opposite the sides connected to the conductor 13 by settable means S comprising a pair of manually operative switch mechanisms. Said switch mechanisms are superposed to each other, as shown in Figure 8, but are shown juxtaposed to each other in Figure 2 to clearly illustrate the electrical circuits. One of said switch mechanisms is arranged with four equidistantly spaced contacts 39, 40, 41, 42 insulated from each other and adapted to be engaged by a rotatable contact maker having three blade leg portions 43, 44, 45 extending at right angles and electrically connected to each other, so that the contact maker will engage and electrically connect three adjacent contacts in every position thereof. The other switch mechanism is arranged with four equidistantly spaced contacts 39′, 40′, 41′ and 42′ corresponding to and in alinement with the contacts 39, 40, 41 and 42, respectively, and a contact member having three electrically connected blade portions 43′, 44′ and 45′ corresponding to the blade portions 43, 44 and 45 of the first mentioned switch mechanism. The contact makers of the switch mechanisms are mounted on a common shaft with a blade of each contact maker in line with its corresponding blade of the other contact maker. Contacts 39 and 42′ are connected to each other by a wire 46 and connected to a contact 47 mounted in the depression 29 of the mercury switch tube 28 through a wire 48 connected to said contact 47 and wire 46. The contact 40 is connected to a contact 49 mounted in the depression 33 through a wire 50 connected to the contacts 40 and 49. The contacts 41 and 41′ are dead contacts which are not connected to either the contacts of the mercury switch or the heating elements. Contact 42 is in circuit with a contact 51 fixedly mounted in depression 31 of the mercury tube 28 through a wire 52 connected to said contacts. Contact 39′ is in circuit with the heating element or portion 26 through a wire 53, and contact 40′ is in circuit with the heating element or portion 27 through a wire 54. It is possible by the circuits described to regulate the heating of the water in the reservoir 8, so that the water may be heated to three predetermined degrees. In the illustration shown in Figure 2, the heating element or portion 26 has an electric heat output or power of 700 watts and the element or portion 27 has an electric power of 500 watts. In the position of the contact makers shown in Figure 2, the element 27 will be energized in the initial or cold position of the mercury switch tube 28 with the mercury therein in the depressions 29 and 30, by the current passing from one side of the source of electricity through conductor 21, contact 34, the mercury, contact 47, wires 48 and 46, contact 42′, contact maker blades 45′, 43′, contact 40′, wire 54, element 27 and conductor 13 to the other side of the source of electricity. If the contact makers 43, 44, 45, 43′, 44′, 45′, remain in the position shown in Figure 2, the heating elements 26 and 27 are cut out of circuit with the source of electricity by the next successive actuation of the mercury switch by the temperature of the water created by heating element 27, which actuation will position the mercury in depressions 30 and 31. The mercury in this position will close the circuit between contacts 34 and 51 of the mercury switch but in the Figure 2 position of the settable switch the circuit between the heating elements 26, 27 and the source of electricity will be open between contacts 39 and 42 of the settable switch. Therefore, in the Figure 2 position of the settable switch, the water in the reservoir 8 will not be heated to a temperature higher than the heat output of heating element 27, or 500 watts in the present instance.

If it is desirable to heat the water in the reservoir to a slightly higher temperature, the heating element or portion 26 will be placed in circuit with the source of electricity by setting the contact maker blades 43, 44, 45 into engagement with contacts 41, 42, 39, respectively, and contact maker blades 43′, 44′, 45′ into engagement with the contacts 41′, 42′, and 39′, so that the initial position of the mercury tube 28 with the mercury in the depressions 29 and 30 will complete the circuit of the heating element 26 with the source of electricity through conductor 21, contact 34, the mercury, contact 47, wires 48, 46, contact 42′, contact maker blades 44′, 45′, contact 39′, wire 53, element 26 and conductor 13. The element 26 will remain energized in all the subsequent positions of mercury switch tube 28 except the last circuit making position. In the position of the tube 28 with the mercury in depressions 30 and 31, the circuit will be completed through conductor 21, contact 34, the mercury, contact 51, wire 52, contact 42, contact maker blades 44, 45, contact 39, wire 46, contact 42′, contact maker blades 44′ and 45′, contact 39′, wire 53, element 26 and conductor 13. In the position of the tube 28 with the mercury in depressions 31 and 32, the circuit will be completed through conductor 21, contact 34, arcuate conductor 35, the mercury, contact 31, wire 52, contact 42, contact maker blades 44 and 45, contact 39, wire 46, contact 42′, contact maker blades 44′, 45′, contact 39′, wire 53, element 26 and conductor 13. In the last circuit making position of the tube 28 with the mercury in depressions 32 and 33, the circuit is open at contact 40, as there is no contact maker blade engaging said contact 40. Therefore, the water in the reservoir 8 will be heated to a temperature commensurable to the 700 watts of the heating element 26, when the switch mechanism is adjusted to the last described position.

The water in the reservoir 8 may be heated to the highest temperature possible by the combined heat output of heating elements 26 and 27 by setting the contact maker blades 43, 44, 45 to engage contacts 42, 39, 40, respectively, and contact maker blades 43′, 44′, 45′ to engage contacts 42′, 39′, 40′, respectively. In the initial position of the mercury tube switch 28, the mercury will be positioned in depressions 29 and 30 and the circuit will be completed through conductor 21, contact 34, the mercury, contact 47, wires 48 and 46, contact 42′, contact maker blades 43', 44' and 45', contacts 39' and 40', wires 53 and 54, elements 26 and 27, and conductor 13. In the next two successive positions of the mercury switch tube 28 with the mercury either in pockets 30, 31 or 31, 32, the current from the source of supply will be connected to contact 51 through either contact 34 or conductor 35 and the current from contact 51 will travel to the heating elements 26, 27 through wire 52, contact 42, contact making blades 43, 44, contact 39, wire 46, contact 42', contact making blades 43', 44', 45', contacts 39', 40', and wires 53, 54. In the next successive position of the mercury tube switch, the mercury will be in pockets 32, 33 and the circuit will pass through conductor 21, contact 34, conductor 35, the mercury, contact 49, wire 50, contact 40, contact making blades 45, 44, contact 39, wire 46, contact 42', contact making blades 43', 44', 45', contacts 39', 40', wires 53, 54, heating elements 26, 27, and conductor 13. When the thermostat 18, 19 affected by the temperature of the water created by the heating elements 26, 27, actuates the mercury switch tube 28 to position all the mercury in the end of the tube arranged with the pocket 33, the heating elements will be de-energized by cutting off the side of the source of electricity connected to conductor 21 from the contact 49 of the mercury switch, as the mercury in the tube 28 will not be in engagement with either the contact 34 or conductor 35.

The heating portions or elements 26 and 27 are disconnected from the source of electricity by adjusting the settable switch to position the contact making blades 43, 44, and 45 to engage contacts 39, 40 and 41, and the contact making blades 43', 44' and 45' to engage contacts 39', 40' and 41', respectively, so that the contacts 42 and 42' are open.

The settable switch shown in Figure 2 is arranged with suitable indices thereon to indicate the predetermined temperatures at which the water in the reservoir may be heated by the heating means mounted therein, whereby mistakes and incorrect connections are avoided.

The electric circuit shown in Figure 2 may be adapted for heating the water in the reservoir by electricity obtainable at a low rate of cost, as during the night period when public consumption is slight, by providing heating elements 26, 27 having a heat output capable of heating the contents of the reservoir 8 to the highest desirable temperature within the period of low cost electricity.

The following table sets forth the results obtained in heating water in a reservoir of 26 gallons by the four adjustable positions of the settable switch mechanism in the sequence described hereinbefore:

| Switch position | Heating to— | Heat output in watts | Heating time, approximately |
|---|---|---|---|
| | °C. | | Hours |
| 1 | 0 | 500 | 8 |
| 2 | 50 | 700 | 8 |
| 3 | 85 | 1200 | 8 |
| 4 | | | |

To obtain greater economy in heating water than that offered by the circuits disclosed in Figures 1 and 2, there is provided a settable switch having four separate switch mechanisms particularly adapted for regulating the circuits of heating elements or portions 26, 27, with two meters for registering the amount of electricity used at different rates of cost depending upon the time said electricity is used. This embodiment of the invention is illustrated in Figures 3 to 7, inclusive, wherein the heating elements 26 and 27 are arranged as separate units with the element 26 mounted in the reservoir 8 in a higher plane than the element 27, and the element 26 constituting an auxiliary heating unit and the element 27 constituting the main or primary heating unit. The heating element 26 is mounted in elevated position in the reservoir 8 by a tubular insulated member 55 fixed in the bottom of the reservoir and extended upwardly to a point intermediate the top and bottom of the reservoir. The heating element 26 is shielded from the bottom of the reservoir by a cup shaped member 56 to direct the heat of said element 26 toward the upper portion of the reservoir. The heating element 27 is mounted adjacent the bottom of the reservoir by a tubular insulated member 57, so that the heating element 27 will primarily heat the water in the lower portion of the reservoir. One terminal of each of the heating elements 26, 27 is connected to one side of a source of electricity by the conductor 13, and the opposite terminals of the heating elements 26 and 27 are connected to portions of the settable switch by wires 53 and 54, respectively.

The energization of the heating elements 26, 27 is regulated by the temperature of the contents of the reservoir 8 through the thermostat 18, 19 operatively connected to a mercury switch of the structure shown in Figure 1 comprising a straight tube 14 containing mercury and arranged with three spaced depressions or pockets arranged with fixed contacts 15, 16 and 17. The thermostat 18, 19 is mounted in the reservoir to extend in the heating zones of the heating elements 26, 27.

The regulation of the heating elements 26, 27 by the thermostatically operative mercury switch 14, 15, 16, 17 is manually controlled by the settable switch to heat the contents of the reservoir to two predetermined temperatures. The settable switch is of a structure similar to the settable switch shown in Figure 2 with the exception that the switch shown in Figure 3 comprises four switch mechanisms 58, 59, 60 and 61 instead of two switch mechanisms shown in Figure 2. The switch mechanism 58 is arranged with two insulated contacts 62 and 63 and a rotatable L shaped contact maker 64 adapted to engage and connect the contacts 62, 63. The contact 62 is electrically connected with the terminal of heating element 26 by wire 53. Switch mechanism 59 has two contacts 66 and 67 insulated from each other and adapted to be connected to each other by a T shaped contact maker 68 coupled to the contact maker 64 with the portions of the contact maker 64 coinciding with the leg and a section of the cross portion of the contact maker 68. The switch mechanism 59 is mounted superposed to the switch mechanism 58, as shown in Figure 8, with contacts 66 and 67 in line with contacts 62 and 63, respectively. The contact 66 is electrically connected with contact 63 through a wire 69 and electrically connected with the free terminal of heating element 27 by a wire 54. The contact 66 is also electrically connected with contact 15 of the mercury switch by a wire 71. The contact 67 of switch 58 is electrically connected with the contact 17 of the mercury switch by a wire 72. The switch mechanism 60 is arranged with three contacts 73, 74, and 75 and a T shaped contact maker 76 coupled with and extending in the same plane as the contact makers 64 and 68 but positioned with the configurations extending at a right angle to the configurations of the contact maker 68. Contact 73 is electrically connected with contact 16 of the mercury switch by a wire 77 and contact 73 and 75 are electrically connected, as shown at 78. The switch mechanism 60 is mounted in superposed relation to the switch mechanisms 58 and 59 with the contact 73 in line with contacts 62 and 66, respectively, and contact 74 in line with contacts 63 and 67, respectively. The switch mechanism 61 is arranged with four contacts 79, 80, 81, 82 and an L shaped contact maker 83 coupled with the contact makers 64, 68, 76 and positioned with the configurations thereof extending at 180° to the configurations of contact 64. Switch mechanism 61 is mounted in superposed relation to the switch mechanisms 58, 59, 60, with the contact 79 in line with contacts 62, 66, 73, respectively, contact 80 in line with contacts 63, 67, 74, respectively, and contact 81 in line with contact 75 of switch mechanism 60. Contacts 79 and 81 are permanently connected by a wire 83', and contact 79 is electrically connected with contact 74 of switch mechanism 60 by a wire 84. The contact 80 is connected by a conductor 85 to a meter (not shown) connected to a source of electricity and adapted to register the electricity at a low rate or tariff, and contact 82 is connected by a conductor 86 to another meter (not shown) connected to the same source of electricity but registering said electricity at the normal rate or tariff.

The switch mechanisms 58, 59, 60 and 61 are adapted to be adjusted to four different positions, as shown in Figures 4 to 7, inclusive, to preselect two different temperatures to which the water may be heated by the heating elements 26 and 27 in reservoir 8 at different costs and within different periods of time. In the Figure 4 position of the switch mechanisms 58, 59, 60 and 61, the water is heated from the meter registering the low rate of electricity, by heater 27 to a low temperature, as the circuit of heater 27 will be opened when the mercury switch 14 is actuated by the thermostat 18, 19 to position the mercury out of engagement with the contact 15 of the mercury switch, the circuit being broken at contact 67 of the switch mechanism 59. In the Figure 5 position of the switch mechanisms, the water is also heated from the meter registering the low rate of electricity but to a higher temperature by the heating element 27, as the heating element 27 is energized for a longer period of time due to the fact that the circuit of said heating element will remain close until the mercury switch is actuated by the temperature of the water in the reservoir to position the mercury out of engagement with the contact 16 thereof. In the Figure 6 position of the settable switch mechanisms, the water is heated from the meter registering the normal rate of cost electricity by both heating elements 26, 27 to reduce the time required in heating the water to the highest temperature and thereby keep down the cost of heating the water when it is necessary to use the electricity at the normal rate of cost, as during the day. In this last position of the settable switch mechanisms, the heating elements are maintained in circuit with the source of electricity until the mercury in the mercury switch tube is positioned out of engagement with the contact 16 through the actuation of the mercury switch 14 by the rise in temperature of the water in the reservoir. In the Figure 7 position of the settable switch mechanism, the heating elements 26 and 27 are disconnected from the source of electricity and the water in the reservoir 8 will not be heated, as the circuit from the meter for low cost electricity will be opened at contact 80 of switch mechanism 61 and the circuit from the meter for high or normal cost electricity will be opened at contact 74 of switch mechanism 60, so that contact 16 of the mercury switch will be disconnected from the source of the electricity.

The water in a 21 gallon reservoir will be heated by the heaters 26 and 27 having a heat output of 1.5 kw. and 1 kw., respectively, under the control of the settable switch mechanisms 58, 59, 60 and 61, as follows:

| Position of settable switch mechanisms | Temperature of water | Heating element energized | Source |
|---|---|---|---|
| | °C. | | |
| Figure 4 | 50 | 27 | Low cost meter. |
| Figure 5 | 85 | 27 | Do. |
| Figure 6 | 85 | 26 and 27 | High cost meter. |
| Figure 7 | | | |

By the circuit and settable switch mechanism shown in Figures 3 to 7, inclusive, the water in the reservoir may ordinarily be heated by heating element 27 to a low temperature from the low rate meter, sufficient for the usual household requirements by adjusting the settable switch mechanism to the Figure 4 position. If the requirements for hot water are suddenly increased, the settable switch mechanism is adjusted to the Figure 6 position when the heating elements 26 and 27 are energized from normal rate meter. It is possible by adjusting the settable switch mechanism to the Figure 4 position to prevent heat losses of the water in the reservoir and incrustation of the reservoir, and decrease the cost of operation.

The mounting of the heating element 26 in the manner disclosed in Figure 3 will facilitate the rapid heating of the water, as the amount of water directly heated by said heating element is comparatively small, and the portion of water drawn off by the discharge pipe 10 is nearer the heating element 26.

To prevent waste in heating the water while the settable switch is adjusted to the Figure 6 position when the requirement for the hot water has ceased, there is provided means adapted to be actuated by the withdrawal of water from the reservoir and adjust the settable switch mechanisms 58, 59, 60, 61 to disconnect the normal rate meter from the circuit and connect the low rate meter in said circuit. There are two embodiments of said means shown in Figure 8, but both of said embodiments are connected in the circuit of an electromagnet, illustrated in a general way and comprising a coil 87 and a plunger core or armature 88 having one end connected to transmission means, as illustrated in a general way at 89, adapted to transmit longitudinal movement of the armature 88 to rotary movement to a shaft 90 on which the contact makers 64, 68, 76 and 83 are mounted. One embodiment of said adjusting means comprises a pressure responsive member, such as a Bourdon coil 91, connected in the inlet pipe 9 of the reservoir 8 and having at its free end a contact 92 electrically connected to one end of the coil 87 by a wire 93 and adapted to engage a fixed contact 94 by pressure created in said Bourdon tube by water flowing into the reservoir 8. The fixed contact 94 is electrically connected by a wire 95 to the side of the source of electricity of the electromagnet opposite to the side thereof connected to the electromagnet by a wire 96. When water is discharged from the reservoir 8, water from the source of supply will pass through the inlet pipe 9 and actuate the Bourdon tube 91 to energize the electromagnet 87 and actuate the settable switch mechanisms 58, 59, 60, 61, to the Figures 4 or 5 position. The other embodiment of the adjusting means comprises a temperature responsive device in the form of a bimetal strip 97 mounted in contact or adjacent to the discharge pipe 10 of the reservoir 8 and having a contact 98 adapted to engage a fixed contact 99 when hot water is discharged from the reservoir. The movable contact 98 is connected to the wire 93 and the contact 99 is connected by a wire 100 to the wire 95. Both or only one of the embodiments shown in Figure 8 may be used.

Having thus described my invention, I claim:

1. In a water heater, a water reservoir, electric heating means having different heating values mounted in the reservoir and directly connected to one side of a source of electricity, a multiple contact mercury switch mechanism adjustably mounted, one contact of said mercury switch mechanism being connected to the side of the source of electricity opposite the side connected to the heating means, and the other contacts being connected to different portions of the heating means, a temperature expansion rod mounted in the reservoir to be affected by the temperature of the water therein and operatively associated with the mercury switch mechanism to initially adjust the mercury to close the circuit of the portion of the heating means of low heating value, then open said circuit of the portion of low heating value and simultaneously close the circuit of the portion of high heating value of the heating means, then open the circuit of the portion of high heating value, and then simultaneously close the circuits of both the low and high heating portions of the heating means, and settable switch mechanism interposed in the connections between the contacts of the mercury switch mechanism and the different portions of the heating means and adapted to select a predetermined portion of the heating means to be placed in circuit with the source of electricity by the mercury switch mechanism.

2. In a water heater, a water reservoir, electric heating means mounted in the reservoir and connected to one side of a source of electricity, a multiple contact mercury switch mechanism having a contact connected to the opposite side of the source of electricity and having a plurality of contacts connected to the heating means, a temperature expansion rod mounted in the reservoir and operatively associated with the mercury switch mechanism to adjust said switch mechanism to predetermined positions corresponding to variations in temperature of the water in the reservoir, and settable means comprising a series of switches, each switch having a plurality of contacts connected in circuit with the mercury switch mechanism and heating means, and contact makers for each settable switch adapted to be actuated in unison into engagement with corresponding contacts to connect predetermined contacts of the mercury switch mechanism in circuit with the heating means and heat the water in the reservoir to a predetermined temperature.

3. In an electric heater, a plurality of electric heating elements of different electric power, connected to one side of a source of electricity, an electric switch mechanism having a series of fixed contacts and an adjustable contact maker, a plurality of said fixed contacts being connected to the opposite side of the source of electricity, a temperature expansion rod mounted to be affected by the temperature of the heating elements and associated with the switch mechanism to adjust the contact maker to progressively connect one of the fixed contacts connected to the source of electricity with any of the other fixed contacts, and settable means to select a predetermined heat to be attained by the heater, comprising a pair of switch mechanisms having a series of corresponding contacts and associated contact makers adapted to connect a plurality of said series of contacts, one of said settable switch mechanisms having contacts directly connected to the electric heating elements and the other settable switch mechanism having contacts connected to the contacts of the thermostatically adjustable switch mechanism, and each of said settable switch mechanisms having contacts connected to each other and the associated contact makers adapted to be actuated simultaneously.

4. An electric heater as claimed in claim 3, wherein the contact maker of the thermostatically adjustable switch mechanism is normally positioned in engagement with one contact thereof in circuit with the source of electricity, and the contacts of the settable switch mechanisms connected to each other are connected to said contact normally engaged by the contact maker of the thermostatically adjustable switch mechanism.

5. In an electric heater, a pair of electric heating elements of different electric power directly connected to one side of a source of electricity, a thermostatically operative switch mechanism having a series of fixed contacts and a contact maker adjustable by a rise in temperature caused by the heating elements to connect any two adjacent contacts, and manually settable means to effect the completion of the circuit of any or both of the electric heating elements by the actuation of the thermostatically operative switch mechanism, comprising a plurality of switch mechanisms having a series of spaced contacts and associated contact makers adapted to simultaneously engage a plurality of contacts of each series of contacts, one of said settable switch mechanisms being connected to the opposite side of the source of electricity, a second settable switch mechanism being connected to the first settable switch mechanism and connected to a contact of the thermostatically operative switch mechanism, a third settable switch mechanism being connected to the remaining contacts of the thermostatically operative switch mechanism and connected to one of the electric heating elements, and a fourth settable switch mechanism being connected to the third settable switch mechanism and the other electric heating element.

6. An electric heater as claimed in claim 5, wherein the fourth settable switch mechanism is connected to the electric heating element of highest electric power.

7. An electric heater as claimed in claim 5, wherein the first settable switch mechanism is connected to the source of electricity by two wires transmitting electricity at different costs.

8. In a water heater, a water reservoir, a plurality of electric heating elements mounted at different levels in the reservoir and directly connected to one side of a source of electricity, a multiple contact mercury switch, a temperature expansion rod mounted in the reservoir adjacent to the heating elements and operatively associated with the mercury switch, and settable means electrically connected to the opposite side of the source of electricity, to all of the contacts of the mercury switch and to both of the heating elements and adapted to select a predetermined heating element to be placed in circuit with the source of electricity by the actuation of the mercury switch by the temperature expansion rod.

9. A water heater as claimed in claim 8, wherein the uppermost heating element is shielded from the lower portion of the reservoir by a cup shaped member.

10. In a water heater, a water reservoir having an inlet and outlet, heating means mounted in the reservoir adapted to heat the water to different temperatures and directly connected to one side of a source of electricity, manually settable switch mechanism connected to the opposite side of the source of electricity and to the heating means adapted to connect different parts of the heating means in circuit with the source of electricity and heat the water to predetermined temperatures, and means operatively associated with the manually settable switch mechanism and adapted to be actuated by the withdrawal of water from the reservoir and predeterminedly adjust the manually settable switch mechanism when the water has been heated to a predetermined temperature.

11. A water heater as claimed in claim 10, wherein the means to adjust the manually settable switch mechanism comprises electromagnetic means having the armature operatively associated with the manually settable switch mechanism to adjust said switch mechanism, and switch mechanism connected in the circuit of the electromagnetic means and adapted to be actuated by the pressure in the reservoir inlet to close the circuit of the electromagnetic means and adjust the manually settable switch mechanism.

12. A water heater as claimed in claim 10, wherein the means to adjust the manually settable switch mechanism comprises electromagnetic means having the armature operatively associated with the manually settable switch mechanism to adjust said switch mechanism, and thermostatically operative switch mechanism connected in the circuit of the electromagnetic means and mounted to be affected by the temperature of the water passing through the reservoir outlet whereby the circuit of the electromagnetic means is closed and the manually settable switch mechanism is adjusted.

THEODOR STIEBEL.